: United States Patent  
Greyson (10) Patent No.: US 9,053,695 B2  
(45) Date of Patent: Jun. 9, 2015

(54) IDENTIFYING MUSICAL ELEMENTS WITH SIMILAR RHYTHMS

(75) Inventor: Paul Greyson, Oakland, CA (US)

(73) Assignee: Avid Technology, Inc., Burlington, MA (US)

(*) Notice: Subject to any disclaimer, the term of this patent is extended or adjusted under 35 U.S.C. 154(b) by 508 days.

(21) Appl. No.: 12/717,446

(22) Filed: Mar. 4, 2010

(65) Prior Publication Data

US 2011/0214556 A1 Sep. 8, 2011

(51) Int. Cl.  
*G10H 1/40* (2006.01)

(52) U.S. Cl.  
CPC ....................................... *G10H 1/40* (2013.01)

(58) Field of Classification Search  
USPC .......................................................... 84/611  
See application file for complete search history.

(56) References Cited

U.S. PATENT DOCUMENTS

| 4,763,554 | A | * | 8/1988 | Kozuki | 84/611 |
|---|---|---|---|---|---|
| 5,635,659 | A | * | 6/1997 | Miyamoto | 84/635 |
| 6,121,533 | A | * | 9/2000 | Kay | 84/616 |
| 6,469,240 | B2 | * | 10/2002 | Pachet et al. | 84/635 |
| 7,081,579 | B2 | | 7/2006 | Alcalde et al. | |
| 7,276,655 | B2 | * | 10/2007 | Lin et al. | 84/603 |
| 2007/0214941 | A1 | * | 9/2007 | Kourbatov | 84/609 |

OTHER PUBLICATIONS

Dixon, Simon et al., "Towards Characterisation Of Music via Rhythmic Patterns", Universitat Pompeu Fabra, 2004, 8 pages.  
Ellis, Daniel, et al., "Eigenrhythms: Drum Pattern Basis Sets For Classification And Generation", Universitat Pompeu Fabra, 2004, 10 pages.  
Foote, Jonathan, et al., "Audio Retrieval by Rhythmic Similarity", IRCAM Centre Pelpidou, 2002, 8 pages.  
Gouyon, Fabien, A Computational Approach To Rhythm Description: Audio Features for the computation Of Rhythm Periodicity Functions And Their Use In.  
Tempo Induction And Music Content Processing, A Disseration, Universitat Pompeu Fabra, 2005, pp. ii-188.  
Mongeau, Marcel, "Comparison of Musical Sequences", Computers and the Humanities 24:161-175, 1990 Kluwer Academic Publishers, pp. 161-175.  
Paulus, Jouni, "Measuring the Similarity of Rhythmic Patterns", IRCAM Centre Pompidou, 2002, 7 pages.  
Termes, Enric Guas i., New Approaches For Rhythmic Description Of Audio Signals, Research, Pompeu Fabra University, Sep. 2004, pp. 1-83.  
Toussaint, Godfried, "A Comparison of Rhythmic Similarity Measures", McGill University Technical Report SOCS-TR-2004.6, Aug. 2004, 23 pages.  
MPEG-7 Overview, ISO/IEC JTC/SC29/WG11N6828, Oct. 2004, pp. 1-93.  
Gonzalez, Francisco Sanchez, "A Numerical Theory Of Rhythm Applied To Oriental Music Analysis", 1998, 12 pages.  
Casciato, Carmine, "Computation of Rhythmic Similarity In Music", Feb. 2001, 3 pages.  
Kadota, Takashi et al., "Musical Sequence Comparison for Melodic and Rhythmic Similarities", Proceedings of the 8th Int'l Symposium on SPIRE, Nov. 13-15, 2001, 12 pages.  
Martins, Joao M., et al., "Similarity Measures for Rhythmic Sequences", Computer Music Research, University of Plymouth, UK, Sep. 13, 2005, 10 pages.  
Demaine, Erik D., et al., "The Distance Geometry of Deep Rhythms and Scales", Proceedings of the 17th Canadian Symposium on Computational Geometry, Aug. 10-12, 2005, 4 pages.

* cited by examiner

*Primary Examiner* — Christopher Uhlir  
(74) *Attorney, Agent, or Firm* — Oliver Strimpel (57) ABSTRACT

A compositional tool classifies and indexes loops in a library of audio loops by generating a time-stamped series of the durations of the percussive events that comprise each loop. The duration of a percussive event is based on spectral masking, in which a subsequent event having a spectral similarity to a prior event terminates the prior event. A composer queries the library with a query loop, and the system returns loops ranked according to the distance of their rhythmic signatures from that of the query loop, the distance determination being based on dynamic time warp analysis. Rhythmic signatures may also be used to classify and index video sequences.

19 Claims, 3 Drawing Sheets

IDENTIFYING MUSICAL ELEMENTS WITH SIMILAR RHYTHMS

BACKGROUND

Music composers are increasingly making use of libraries of audio loops. As such libraries continue to proliferate in size and type, composers would benefit from tools that can assist in identifying suitable loops for consideration in a composition. Composers might wish to consider loops that span more than one genre, and that include material that has not been classified or tagged with descriptive metadata.

However, research and development in this field has been principally directed to music recommendation systems for music listeners. Such systems typically base their recommendations on the listening patterns of a large corpus of users, primarily with the goal of recommending songs to listeners that are similar to ones that they already like, often with a view to stimulating the purchase music. One example of such a system is the Genius Bar feature from Apple Computer, Inc. Other systems use an analysis of specific musical features, as for example in the Music Genome Project of Pandora Media, Inc., in which music is categorized by hand in order to represent a piece of music as a flat "vector" of musical attributes. Each attribute is "scored" for each piece of music.

SUMMARY

A rhythmic signature is used to classify and organize time-based media, including audio and video. Such a signature provides a valuable tool for composers seeking to expand the repertoire of musical elements in their compositions. The rhythmic signature incorporates the concept of a perceived duration of percussive events.

In general, in one aspect, the invention features methods, systems, and computer program products for retrieving a musical element from a library that includes a plurality of musical elements involving: receiving an indication of a query musical element comprising a first plurality of percussive events; generating a rhythmic signature for the query musical element, wherein the rhythmic signature of the query musical element comprises a time-stamped series of durations of the first plurality of percussive events; searching the library for a candidate musical element having a rhythmic signature that is closest to the rhythmic signature of the query musical element, the rhythmic signature of each of the plurality of musical elements in the database comprising a time-stamped series of durations of the plurality of percussive events that comprise that musical element; and retrieving the candidate musical element.

Various embodiments include one or more of the following features. Generating a duration of a percussive event includes detecting an onset of the percussive event, determining a spectral signature of the percussive event, detecting an onset of a second percussive event, the second percussive event being an earliest percussive to succeed the first-mentioned percussive event having a spectral signature substantially similar to that of the first-mentioned percussive event, and equating the duration of the first-mentioned percussive event to a time interval based on a difference between the onset of the second percussive event and the onset of the first-mentioned percussive event. The searching step includes determining, for each musical element of the library of musical elements, a closeness of a rhythmic signature of that element to the rhythmic signature of the query musical element using dynamic time warping. The library of musical elements is indexed according to a characterization of the rhythmic signature of each of the plurality of musical elements. The characterization of the rhythmic signature of each of the plurality of musical elements of the library is based on dynamic time warp analysis of the rhythmic signatures of each of the plurality of elements. The query musical element is characterized by a query pulse, and the candidate musical element is characterized by a pulse that is similar to the query pulse. At least one of the plurality of percussive events is generated by a plurality of instruments. The spectral signature of the first and second percussive events includes a series of values corresponding to a power of the first and second percussive events respectively in a plurality of frequency bins. Generating the time-stamped series of durations of the first plurality of percussive events involves, for each of the first plurality of percussive events: detecting an onset time of that percussive event; determining a spectral signature of that percussive event; detecting onset times of a plurality of subsequent percussive events, defining a duration of that percussive event as a difference between an onset time of a terminating one of the plurality of subsequent events and the onset time of that percussive event, wherein a combination of spectral signatures of each of the plurality of subsequent events is substantially similar to the spectral signature of that percussive event, and the terminating one of the plurality of subsequent events corresponds to the one of the plurality of subsequent events having a latest onset time; and time-stamping the duration of that percussive event with the onset time of that percussive event. The event that corresponds to the terminating event is generated by a single percussive instrument. The query musical element and the candidate musical element each include an audio loop.

DETAILED DESCRIPTION

A musical composition tool, referred to herein as Rhythm Explorer, enables a composer to explore musical elements across genres, including material that has not been tagged with metadata or otherwise classified. Rhythm Explorer analyzes the audio content of musical elements in order to build an index of rhythmic signatures. Using such an index, composers can search through arbitrarily large collections of loops and other musical elements for musically compatible material without the need for labor-intensive tagging of files. Rhythm Explorer also allows users to access content across standard genre categories, which can help composers discover new musical textures.

A key concept is the notion of the perceptual duration of a percussive event. In musical notation, percussion is not represented with notes having duration, unlike the notes for other instruments. Instead, the notation for percussion simply indicates the time at which the percussive note, or event, is to occur, i.e., its onset time. Herein we define the perceptual duration of a percussive event as the time interval between the onset of the percussive event, and the time at which a subsequent event of comparable intensity and timbre occurs. One way of determining whether two percussive events have similar timbres is to determine their spectral signature. If a subsequent event is found to have a spectral signature that is close to a prior event, the end of the prior event is set to the time when the intensity of the second event reaches a predetermined threshold. In the described embodiment, the threshold is defined as a multiplier of the initial intensity of the prior event, the multiplier lying approximately in the range between 0.2 and 2.0, and preferably being approximately equal to 1. This technique corresponds to spectral masking, since the end of a prior percussive event is set to the time when a subsequent event effectively masks the prior event.

In a variation of the spectral masking technique, the end of an initial percussive event is terminated by a combination of more than one subsequent percussive events. In this method, it is the combination of the spectra of the subsequent percussive events that together approximately match the spectrum and intensity of the initial event, and the last event of the subsequent combination of events is taken as the time when the first event terminates. Thus, in this method, the perceptual duration of the initial percussive event is the time interval between the onset of the initial percussive event and the time at which a last percussive event of a combination of subsequent percussive events collectively terminate the initial percussive event. The collective threshold intensity of the combination of subsequent terminating events is defined as a multiplier of the initial intensity of the initial event, the multiplier lying approximately in the range between 0.2 and 2, and preferably being approximately equal to 1.

A second, more accurate method for determining the end of a percussive event uses an identification each instrument played, and terminates an event when a subsequent event is played on the same instrument. This method does not rely on spectral masking analysis. Sometimes instrument identification is not even necessary, as, for example, when a note is defined using MIDI, where the identity of the instrument playing the note is explicitly available. A third approach lies between instrument identification and spectral masking in terms of accuracy, and utilizes techniques drawn from recognition of speech in noisy environments, as well as noise and transient analysis. Such methods may provide mechanisms for assessing the rhythmic signature of tonal instruments by stripping out the tonal variations which could lead a simple multi-band filter to incorrectly treat the high range of an instrument as a distinct rhythmic line from the low range.

Other methods, including those that are not based on spectral masking techniques, of determining percussive event durations can be used to provide the data with which to build rhythmic signatures.

Usually, but not always, the second percussive event that masks the first, and determines its endpoint, will correspond to the next event produced with the same percussive instrument or instrument combination. For example, a first snare-drum beat will be terminated by a second beat of the snare drum. But if there is an intervening beat on a high-hat, or if there is an intervening snare drum beat of less intensity, that will not terminate the snare drum event. Even relatively small differences in intensity between successive events, such as those produced by a subtle emphasis in a repeated pattern will be perceived as a polyrhythm, rather than a single rhythm. Determining the duration of a percussive event in this way generally corresponds to the way the ear hears percussion. We preferentially perceive rhythmic events as defined by repetition of sound events produced by the same instrument. In other words, our perception of the duration of a percussive event is based upon the timing of subsequent events, rather than on the decay of the percussive note itself In practice there is an upper limit of about a few seconds to the length of the time interval across which we perceive a percussive duration as part of a rhythmic sequence. Rhythmic signatures, especially of drum kit loops, often contain multiple overlapping percussive durations. For example, a drum pattern might include a kick drum every four beats, creating one pulse overlaid against a ride symbol pattern with an emphasis every six beats. This overlay is referred to as a "polyrhythm." The Rhythm Explorer rhythmic signature allows for the representation of polyrhythms because the durations associated with a time-stamped event may overlap any number of following events.

In some circumstances, an initial percussive event is terminated by a subsequent event having a different instrument, or combination of instruments, from the initial event. However, the principle of using a subsequent event having a perceptually similar spectral signature still applies in this situation.

The basic outline of the Rhythm Explorer algorithm is as follows. First it generates an index of the available library of audio loops using the concept of a rhythmic signature based upon perceptual durations of percussive events. It then receives a "query" audio loop from the user, and uses the index to retrieve loops which have similar rhythmic signatures. It subsequently returns a ranked list of results for display and audition in a graphical browser. We now describe each stage in the algorithm in detail.

Figure 1:
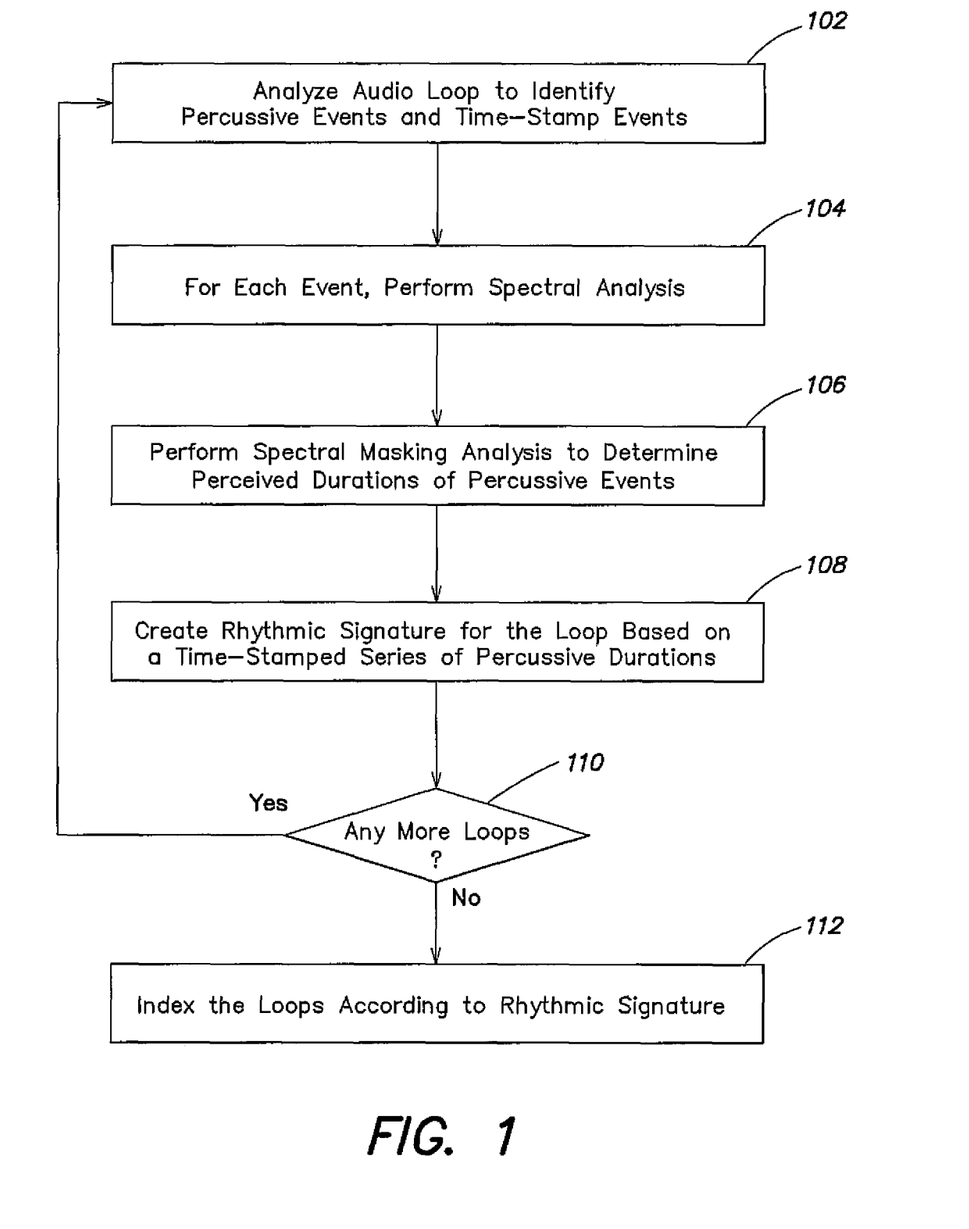
FIG. 1 is flow diagram illustrating indexing of a library of musical loops according to rhythmic signature.

Rhythm Explorer first performs a rhythmic analysis of the library of audio loops that are made available to it in order to create a searchable index for the library. FIG. 1 illustrates the high level steps involved. For each audio loop in the library, the system identifies the percussive events (102) using standard percussive event detection techniques. The technique generates an FFT and then looks for rapid changes in the magnitude of each of the FFT bins. This is combined with time-domain analysis which simply looks for rapid onset of power. The time-domain analysis has greater time-resolution than the FFT analysis. The two combined produce a robust and accurate result. The time at which each event occurs is marked with a time-stamp. In addition, the system performs a spectral analysis of each event (104) using well-known techniques. One such technique involves the use of the mel-frequency cepstrum (MFC) to represent the short-term power spectrum of the sound, based on a linear cosine transform of a log power spectrum on a nonlinear mel scale of frequency. The analysis serves to spectrally classify the percussive event for the purposes of comparing the various detected events, and to use the classified events to perform spectral masking analysis. It is not necessary to use the spectral analysis to explicitly identify the instrument that was used to create the event.

Rhythm Explorer then performs a spectral masking analysis (106) in order to determine the perceptual duration of each percussive event. As discussed above, a second percussive event having a similar spectrum and intensity to a first event is considered to terminate the first event.

In some embodiments, in an alternative to the described method of terminating an initial percussive event with a single subsequent event, a combination of subsequent events is used to terminate the initial event. In this technique, each subsequent event is spectrally analyzed, and the power in each frequency bin is compared with that of the initial even in the corresponding bin. If the power in the frequency bin of the subsequent event is approximately equal to or greater than that in the corresponding bin of the initial event, that frequency bin is terminated. The next event is then analyzed. An initial event is terminated when all of its frequency bins have been terminated by the bins of subsequent events. In various embodiments, the power in a bin of a subsequent event terminates the bin of the initial event when its power lies in a range of 0.2 to 2.0 times, and preferably about equal to, the power of in the bin of the initial event.

In an example of terminating an event with a combination of subsequent events, consider three events: (i) a combination of a kick drum and high hat; (ii) a kick drum; and (iii) a high hat. Assuming that the intensity of the kick drum and high hat are the same in each event, the first event is considered terminated by the third event.

Spectral masking provides an effective technique for determining when to terminate polyphonic percussion samples as well as for certain non-percussion instruments that are used as a percussion instrument, such as a bass guitar. With other instruments, determination of what constitutes an event involves grouping notes that belong together, such as the notes in a tightly connected phrase, such as an arpeggiated chord. For MIDI events, analysis is not required, since the event already includes an explicit identifier for the sound type or instrument.

In the described embodiment, the rhythmic signature analysis only permits a single duration to be associated with each event. This means that when two instruments play at the same time, the algorithm treats these as a composite instrument. Thus the rhythmic signature only partly represents the constituents of a polyrhythm. This simplification provides some of the "fuzzy matching" effect of searching for similar rhythmic signatures because a variety of rhythms with significantly different instrumentation can produce the same signature. What is common among the search results that have similar rhythmic signatures is the pulse of a loop, i.e., a musically salient characteristic of their polyrhythms. By providing at least a partial characterization of a rhythm by its pulse, a rhythmic signature is able provide search results that appear to have serendipitous connections to the query loop.

Figure 2:
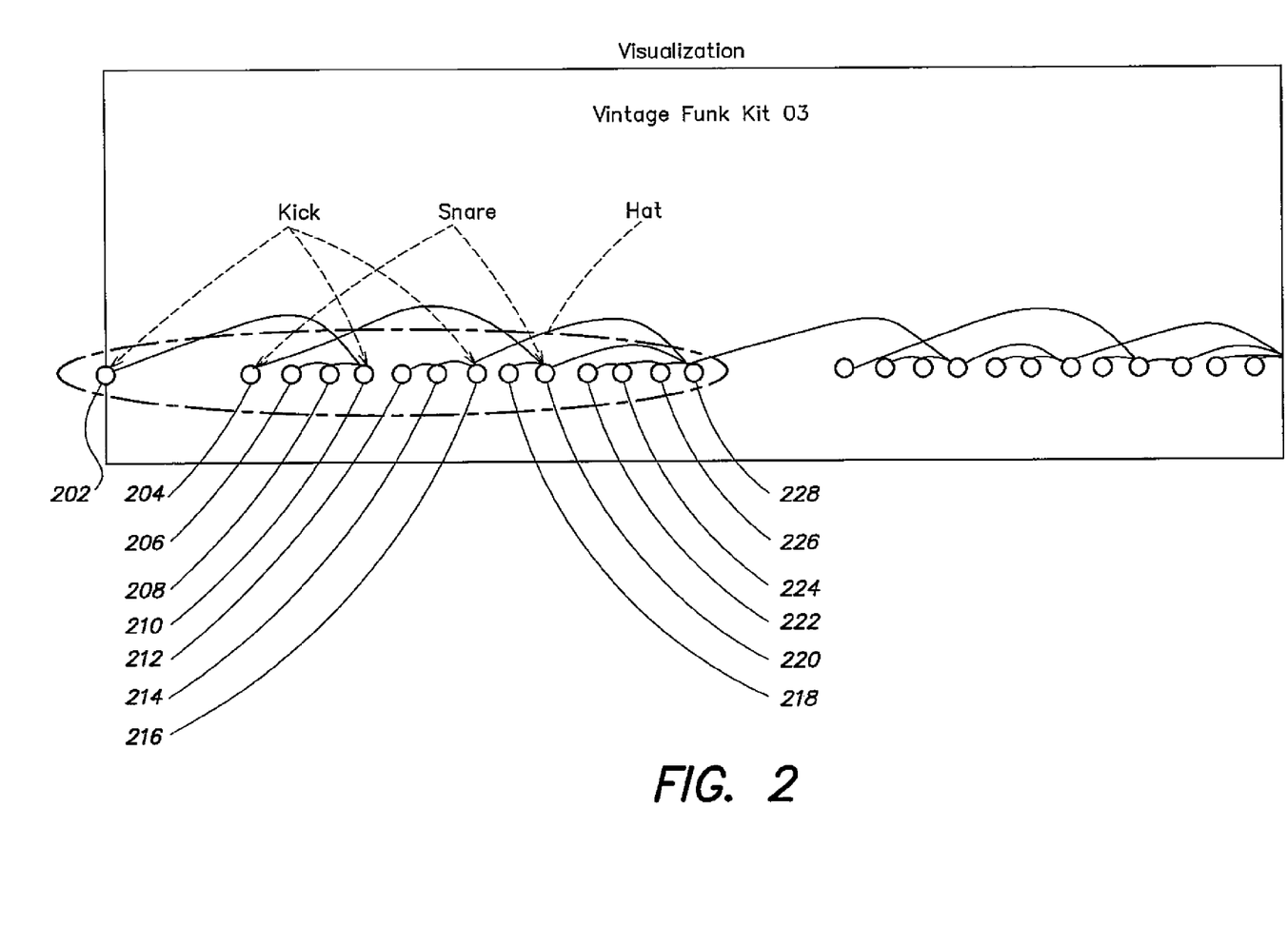
FIG. 2 is a visualization of the perceptual durations of percussive events in a musical loop.

FIG. 2 provides a visualization of a drum polyrhythm that contains a kick drum, snare drum, and high hat. The figure shows event onset times, and durations as determined by spectral masking, with time evolving from left to right, and circles indicating the detected onsets of percussive events. The extent of each arc indicates the duration of the event represented by the circle from which the left end of the arc originates. Each percussive events is detected using a percussive event detector. The system then analyzes the spectrum of each percussive event. Each of the fourteen events 202, 204, 206, 208, 210, 212, 214, 216, 218, 220, 212, 214, 216, 218, 220, 222, 224, 226 and 228 include a high hat. Events 202, 210, and 216 also contain a kick drum, and events 204 and 220 also include a snare drum. Consider event 204, which contains a snare drum and a high hat. It is terminated by event 220, which is the first subsequent event produced by the same combination of instruments, and which is therefore the first subsequent event having the same, or similar, spectral signature and intensity. Similarly, event 210, which contains a kick drum and high hat, is terminated by event 216, the next event having the same combination of instruments. Events that include only the high hat, such as event 206, are terminated by subsequent pure high hat events (such as 208). Note, the event analysis algorithm can not be expected to correspond fully with a human analysis; such discrepancies can stem from variations in emphasis in one of the percussion instruments, or from suboptimal spectral analysis parameter tuning.

Having determined the perceptual duration of each percussive event in an audio loop, the system generates a rhythmic signature for that loop by assembling a series of percussive event durations, each of which is stamped with its onset time (FIG. 1, 108). This rhythmic signature is what is used to characterize the audio loop in making a determination of rhythmic similarity with other audio loops.

The system proceeds through its library of audio loops, repeating for each of the loops the process of finding its percussive events, determining the perceptual duration of each event, such as by performing spectral analysis of each event and applying spectral masking techniques, and assembling a time-stamped series of percussive event durations to generate a rhythmic signature for each loop (FIG.1: 102, 104, 106, 108, 110). The system associates each of the generated signatures with its corresponding loop.

Once rhythmic signatures for the loops in the audio library have been generated, and the library indexed according to the signatures (FIG. 1, 112), the library can be searched by rhythmic signature. A composer provides a query audio loop, which is typically a loop that already forms a part of a composition in progress. The composer wishes to find other loops in the library having a rhythmic signature that is rhythmically related to the provided query loop. If the rhythmic signature is not already available for the query loop, the system generates the rhythmic signature for the query loop, using the methods discussed above. The system then uses dynamic time warp techniques to search the library's index of rhythmic signatures to identify and retrieve loops that have rhythmic signatures that are "close" to that of the query loop.

For dealing with loops of widely varying length, the system uses a simple assumption: if loop A is double the duration of loop B, then the comparison is made between A and B with a repeat. Swung vs. straight $16^{th}$ notes end up resulting in smaller variations than differences in fundamental pulse because the comparison algorithm applies a log scale to differences. Thus, many little differences are interpreted as a smaller impact on the characterization of the rhythmic signature than a small number of big differences. Another heuristic involves the concept of "scope," in which small differences that occur in the context of "large similarities" are reduced in effect.

In some embodiments, the user tunes the parameters of the dynamic time warp analysis in order to weight differences between "large" events that determine a fundamental rhythmic pattern more heavily than "small" events, such as ornaments or elaborations.

Once the system has calculated a degree of similarity or "closeness" of each of the rhythmic signatures in the library index to the rhythmic signature of the query loop, it returns a ranked list of results for display and audition in a graphical browser.

Empirical studies show that audio loops that have similar rhythmic signatures form a valuable set of loops for consideration by composers. Loops selected in this way tend to have rhythmic content with a musical relationship to the query loop, without being constrained to fall within a particular musical genre, share a time signature, or have other explicit common designations. Sufficient variety is introduced to provide ideas for new material, and to support a creative compositional process, while providing a means to narrow the set of selected loops to as small a group as desired by setting the degree of proximity to the signature of a query loop. Furthermore, the degree of imprecision or fuzziness between the query loop and the search results can be adjusted depending on the compositional goals at work. In some situations, a composer may be interested only in results that conform to a certain basic rhythm type, as exemplified by the well-known lyric "It don't mean a thing if it ain't got that swing." One approach to contain fuzziness in result loops is to align the basic pulses of the retrieved loops to the query loop using a warping technique that does not affect pitch, such as the warp marker feature of the Elastic Audio time manipulation processing system in the Pro Tools product, produced by Avid Technology of Tewksbury, Mass.

In addition to providing a compositional tool, rhythmic signatures may be used in the design of lighting to accompany live performances or playback of recorded music. The music is partitioned into a set of rhythmic categories based on the rhythmic signature. A lighting control system bases the selection of lighting on the musical category, activating a lighting preset corresponding to the rhythmic category of the music being played. Such a technique produces lighting that accentuates a rhythmically significant aspect of the music. This contrasts with many existing lighting control systems in which lighting is synchronized with detected high energy pulses in various frequency ranges, i.e., in which lighting is responsive to instantaneous events in the music, without reference to the underlying musical rhythmic structure.

Time-stamped series of event durations can also be generated for video sequences in order to characterize its temporal properties. The events include, but are not limited to, the start of a new shot, the appearance of a particular character, a scene change, or other detectable transition or change in the video. Such a signature can be matched to a corresponding audio sequence. In one application, an editor creating a trailer for a movie wishes to identify a portion of the film that goes together with a theme tune or other prominent motif of the movie sound track. By searching for a video sequence having a rhythmic signature close to that of the sound track theme, the editor can rapidly locate video for the trailer that can match the audio.

Figure 3:
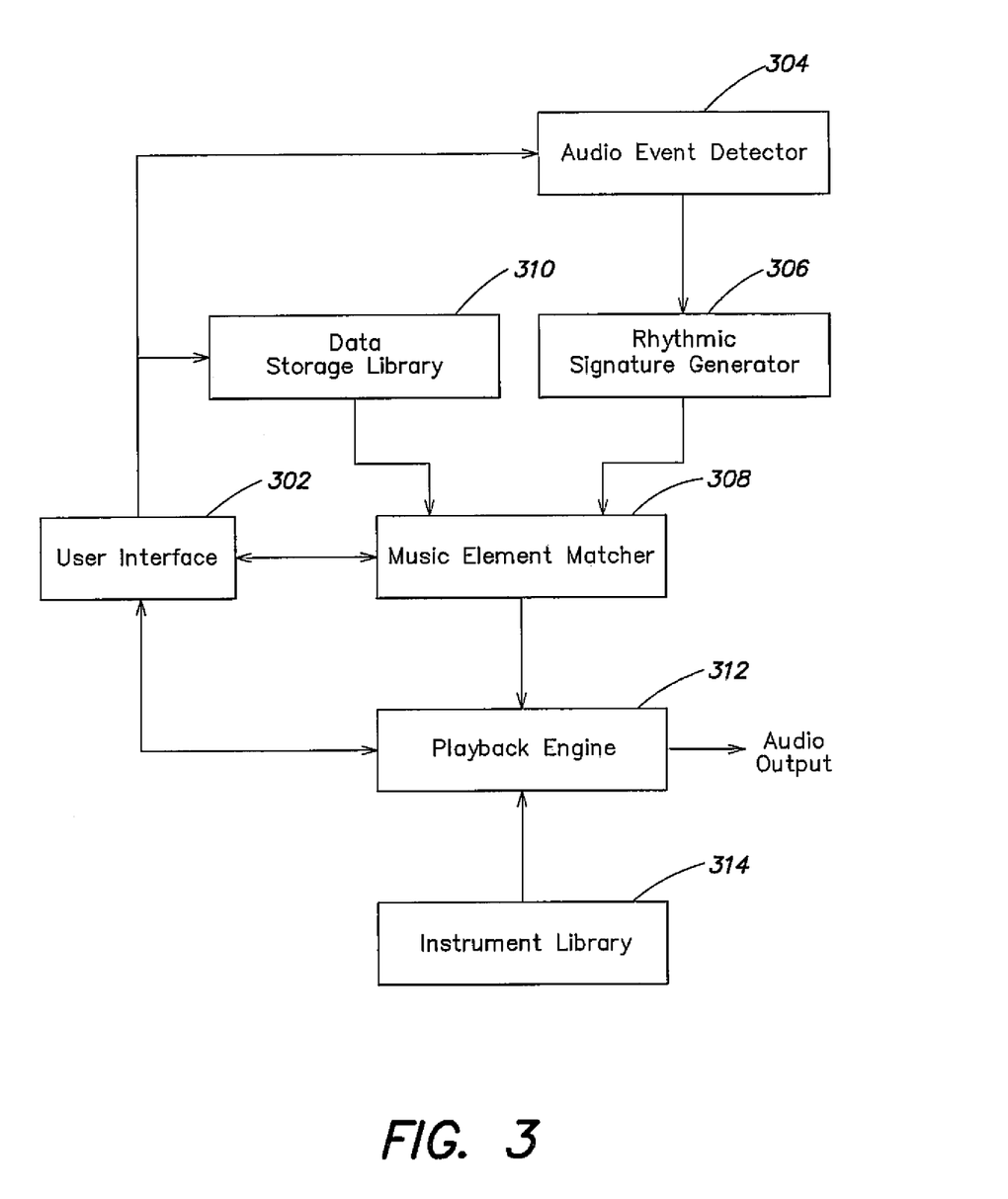
FIG. 3 is a high level block diagram of a system for retrieving musical elements from a library using rhythmic signatures.

The determination of rhythmic signature described above can be extended to include an identification of the percussive instrument that created each event, and the inclusion of the instrument type as part of the rhythmic signature. Such an expanded rhythmic signature can distinguish between two signatures in which the sequence of event durations are the same, but the order of the instruments is altered. For example, using such an extension, the signature of a kick drum followed by a snare drum and two high hats produces a different signature from that of a high hat followed by a kick, followed by two snare drums, even if the rhythmic durations are the same. These two loops may be perceived as being quite different. A composer may find it advantageous to limit the results of a loop search to results having fairly close perceptual similarity to a query loop. On the other hand, the imprecision or fuzziness introduced by the instrument-agnostic signature serves to broaden the range of search results to include examples that may be quite unexpected. For some composers, this may be viewed as a creativity-enhancing compositional advantage, provided the number of loops returned from the search can be kept within reasonable limits FIG. 3 illustrates a system for retrieving musical elements, such as rhythm loops, from a library of musical elements by using rhythmic signatures. User interface 302 enables a composer to provide a query musical element, such as a loop that already forms a part of a composition in progress, and designate a library of musical elements to be searched. The query element is passed through event detector 304 that detects the percussive events within the query element, and records the events' onset times. Next, rhythmic signature generator 306 determines the perceptual duration of each of the detected events, using, for example, the spectral masking techniques described above. It then assembles the detected percussive events into a time-stamped series, each element of the series also including a record of the perceived duration of the percussive event. The output of the rhythmic signature generator is then sent to musical element matcher 308, that has access to data storage library 310. The library includes the database of musical loops designated by the composer for searching. The matcher compares the rhythmic signature of the query loop with the signatures of the loops in the library, and identifies and retrieves loops having substantially similar signatures. Dynamic time warp techniques are used in the process of determining similarity. Using user interface 302, the composer selects one or more of the retrieved loops and listens to them using playback engine 312. The playback engine may access instrument sounds stored in instrument library 314.

In addition to implementations in various audio and video processing products such as digital audio workstations, recorders, playback devices and the like, the various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, audio output devices such as loudspeakers and headphones, and video output devices such as cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of retrieving a musical element from a stored library comprising a plurality of musical elements, the method comprising:
    receiving an indication of a query musical element comprising a plurality of query percussive events;
    generating a rhythmic signature for the query musical element, wherein the rhythmic signature of the query musical element comprises a time stamped series of durations of the plurality of query percussive events;
    searching the library to identify a candidate musical element having a rhythmic signature that is similar to the rhythmic signature of the query musical element, the rhythmic signature of each musical element of the plurality of musical elements in the library comprising a series of time stamped durations of each of a plurality of percussive events that comprise the library musical element,
    wherein searching comprises determining, for each musical element of the library of musical elements, a closeness of a rhythmic signature of the library musical element to the rhythmic signature of the query musical element using dynamic time warping; and
    retrieving the candidate musical element from the library.

2. The method of claim 1, wherein the rhythmic signature for the query musical element is generated by, for each query percussive event:
    detecting an onset time of the query percussive event;
    determining a spectral signature of the query percussive event;
    detecting an onset time of a subsequent query percussive event, the subsequent query percussive event being an earliest percussive event to succeed the query percussive event having a spectral signature substantially similar to the spectral signature of the query percussive event;
    defining a duration of the query percussive event as a time difference between the onset time of the subsequent query percussive event and the onset time of the query percussive event; and
    time-stamping the duration of the query percussive event with the onset time of the query percussive event.

3. The method of claim 2, wherein the library of musical elements is indexed according to a characterization of the rhythmic signature of each of the plurality of library musical elements.

4. The method of claim 3, wherein the characterization of the rhythmic signature of each of the plurality of musical elements of the library is based on dynamic time warp analysis of the rhythmic signatures of each of the plurality of library musical elements.

5. The method of claim 1, wherein the query musical element is characterized by a query pulse, and wherein the candidate musical element is characterized by a pulse that is similar to the query pulse.

6. The method of claim 1, wherein at least one of the plurality of query percussive events is generated by a plurality of instruments.

7. The method of claim 1, wherein the time stamped durations of the plurality of query percussive events are generated by, for each query percussive event:
    detecting an onset time of the query percussive event;
    determining a spectral signature of the query percussive event;
    detecting onset times of a plurality of subsequent query percussive events,
    defining a duration of the query percussive event as a difference between an onset time of a terminating one of the plurality of subsequent query percussive events and the onset time of the query percussive event, wherein a combination of spectral signatures of each of the plurality of subsequent query percussive events is substantially similar to the spectral signature of the query percussive event, and the terminating one of the plurality of subsequent query percussive events corresponds to one of the plurality of query percussive subsequent events having a latest onset time; and
    time-stamping the duration of the query percussive event with the onset time of the percussive event.

8. The method of claim 7, wherein, for at least one of the plurality of query percussive events, the terminating one of the plurality of subsequent query percussive events is generated by a single percussive instrument.

9. The method of claim 1, wherein the query musical element and the candidate musical element each comprise an audio loop.

10. A method of generating an index of a library of musical elements, the library comprising a plurality of library musical elements, each library element including a plurality of percussive events, the method comprising:
    receiving the library of musical elements;
    for each element of the library, generating a rhythmic signature for that element, wherein generating the rhythmic signature comprises:
        for each percussive event of the library element, determining a duration of the percussive event, time stamping the percussive event, and associating the time stamp with the duration with the percussive event; and
        generating a series time-stamped durations corresponding to the percussive events of that element;
    storing the rhythmic signatures of each element in association with its corresponding musical element; and
    characterizing the rhythmic signatures using dynamic time warp analysis.

11. The method of claim 10, wherein obtaining a duration of a percussive event includes:
    detecting an onset of the percussive event;
    determining a spectral signature of the percussive event;
    detecting an onset of a second percussive event, the second percussive event being an earliest percussive event to succeed the first-mentioned percussive event having a spectral signature substantially similar to that of the first-mentioned percussive event; and
    equating the duration of the first-mentioned percussive event to a time interval based on a difference between the onset of the second percussive event and the onset of the first-mentioned percussive event.

12. The method of claim 10, wherein at least one of the plurality of library musical elements includes a percussive event generated by a plurality of instruments.

13. A system for retrieving a musical element from a library of musical elements, the system comprising:

a rhythmic signature generator for generating a rhythmic signature of a query musical element comprising a plurality of query percussive events, the rhythmic signature comprising a time stamped series of durations of the plurality of query percussive events;

a data storage library populated with a plurality of library musical elements, each of the library musical elements including a plurality of percussive events, including percussive events of different intensities and timbres, wherein the library includes a rhythmic signature for each of the library musical elements, each rhythmic signature comprising a series of time stamps and durations of the plurality of percussive events in its corresponding library musical element;

a musical element matcher for comparing the rhythmic signature of the query musical element with the rhythmic signatures of musical elements in the library and for identifying one or more musical elements from the library having rhythmic signatures that are substantially similar to the rhythmic signature of the query musical element, wherein dynamic time warp analysis is used in the determination of substantial similarity between different rhythmic signatures;

an interface permitting a user to provide the query musical element and select one or more of the library musical elements identified by the matcher; and a playback engine for playing the query musical element and the one or more selected musical elements from the library.

14. The system of claim 13, wherein for each percussive event of the plurality of query percussive events, the duration of the query percussive event is based on:

detecting an onset of the query percussive event;

determining a spectral signature of the query percussive event;

detecting an onset of a second query percussive event, the second query percussive event being an earliest query percussive event to succeed the first-mentioned query percussive event having a spectral signature substantially similar to the spectral signature of the first-mentioned query percussive event; and equating the duration of the first-mentioned query percussive event to a time interval based on a difference between the onset of the second query percussive event and the onset of the first-mentioned query percussive event.

15. The system of claim 13, wherein at least one of the plurality of library musical elements includes a percussive event generated by a plurality of instruments.

16. A computer program product comprising:

a computer readable medium;

data stored on the computer readable medium that, when executed by a computer, causes the computer to:

receive an indication of a query musical element comprising a plurality of query percussive events generate a rhythmic signature for the query musical element, wherein the rhythmic signature of the query musical element comprises a time stamped series of durations of the plurality of query percussive events;

access a database comprising a plurality of database musical elements;

search the database for a candidate musical element having a rhythmic signature that is closest to the rhythmic signature of the query musical element, the rhythmic signature of each database musical element comprising a time stamped series of durations of percussive events that comprise the database musical element, wherein the searching includes using dynamic time warp analysis to determine a degree of closeness between a candidate musical element and a query musical element; and retrieve the candidate musical element.

17. The computer program product of claim 16, wherein generating a duration of a query percussive event includes:

detecting an onset of the query percussive event;

determining a spectral signature of the query percussive event;

detecting an onset of a second query percussive event, the second query percussive event being an earliest query percussive event to succeed the first-mentioned query percussive event having a spectral signature substantially similar to the spectral signature of the first-mentioned query percussive event; and equating the duration of the first-mentioned query percussive event to a time interval based on a difference between the onset of the second query percussive event and the onset of the first-mentioned query percussive event.

18. The computer program product of claim 16, wherein at least one of the plurality of database musical elements includes a percussive event generated by a plurality of instruments.

19. A method of retrieving a musical element from a stored library comprising a plurality of musical elements, the method comprising:

receiving an indication of a query musical element comprising a plurality of query percussive events including percussive events of different intensities and timbres;

generating a rhythmic signature for the query musical element, including:

analyzing audio content of the query musical element to identify the plurality of query percussive events, and, for each query percussive event:

detecting an onset time of the query percussive event;

determining a spectral signature of the query percussive event; and detecting an onset time of a subsequent query percussive event, the subsequent query percussive event being an earliest percussive event subsequent to the query percussive event having a spectral signature substantially similar to the spectral signature of the query percussive event;

defining a duration of the query percussive event as a time interval between the onset time of the query percussive event and a time at which a subsequent percussive event of comparable intensity and timbre occurs in the query musical element, such that the duration specified for at least one of the query percussive events overlaps at least one subsequent query percussive event;

time-stamping the duration of the query percussive event with the onset time of the query percussive event; and wherein the rhythmic signature of the query musical element specifies a time stamp and a duration for each query percussive event of the query musical element;

searching the library to identify a candidate musical element having a rhythmic signature that is similar to the rhythmic signature of the query musical element, wherein searching comprises determining, for each musical element of the library of musical elements, a closeness of a rhythmic signature of the library musical element to the rhythmic signature of the query musical element using dynamic time warping, the rhythmic signature of each musical element of the plurality of musical elements in the library specifying, for each percussive event in the library musical element:
a time stamp, and
a duration, a time stamp being defined by an onset of a percussive event in a library musical element and a duration being defined by a time interval between the onset of the percussive event in the library musical element and a time at which a subsequent percussive event of comparable intensity and timbre occurs in the library musical element, such that the duration of at least one of the percussive events in the library musical element overlaps at least one subsequent percussive event; and
retrieving the candidate musical element from the library.

* * * * *